G. E. CLARKE.
Car Coupling.
No. 51,695. Patented Dec. 26, 1865.
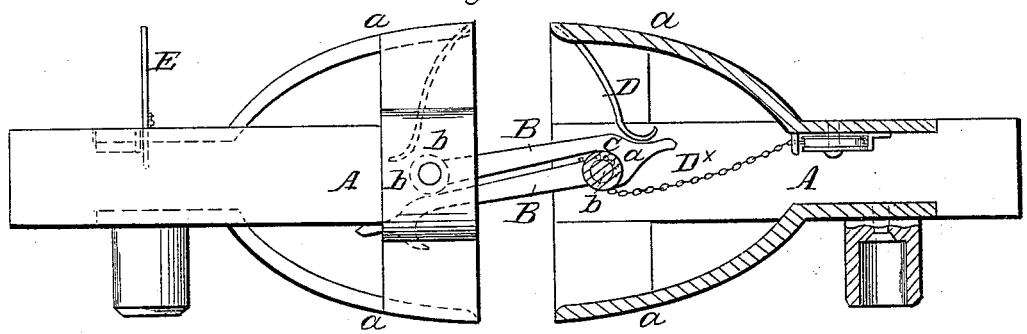
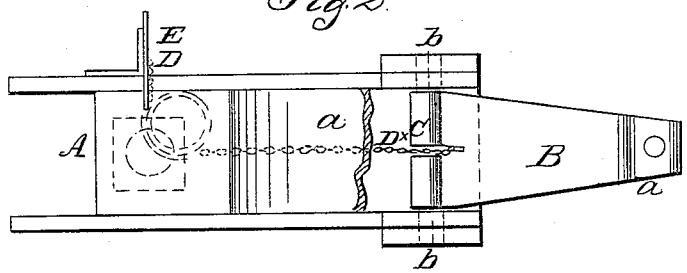
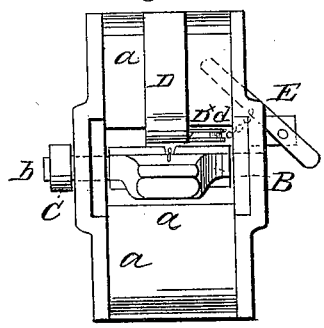
Witnesses:
Inventor:

UNITED STATES PATENT OFFICE.

G. E. CLARKE, OF RACINE, WISCONSIN.

IMPROVEMENT IN CAR-COUPLINGS.

Specification forming part of Letters Patent No. 51,695, dated December 26, 1865.

*To all whom it may concern:*

Be it known that I, G. E. CLARKE, of Racine, in the county of Racine and State of Wisconsin, have invented a new and Improved Car-Coupling; and I do hereby declare that the following is a full, clear, and exact description thereof, which will enable those skilled in the art to make and use the same, reference being had to the accompanying drawings, forming part of this specification, in which—

Figure 1 is a side view of my invention, partly in section; Fig. 2, a plan or top view of one draw-head of the same, partly in section; Fig. 3, a front view of one of the draw-heads of the same.

Similar letters of reference indicate corresponding parts.

This invention relates to a new and improved car-coupling of that class which are termed "self-acting" or "self-coupling;" and it consists in a novel arrangement of shackles or links, springs, and a shackle-releasing mechanism, as hereinafter fully shown and described, whereby two adjoining cars, when coming in contact, will be coupled with certainty and readily uncoupled at any time when necessary, and made to uncouple or disconnect itself in case of a car being thrown from the track, so that said car cannot drag the others connected with it from the track.

A A represent the draw-heads of two adjoining cars. The draw-heads I design to have constructed of wrought-iron, their rear parts being of rectangular form, with top and bottom flaring plates, a a, at their front ends, as shown clearly in Fig. 1, to admit of the ready passing of the shackles B into them, if the platforms of the adjoining cars vary in height.

The shackles B are of flat taper form, with a hook, a, at their front ends, the rear ends of the shackles working on journals b, the bearings of which are in the sides of the draw-heads. One of the journals of each shackle passes through the side of its draw-head, and has a coil-spring, C, connected with it. These coil-springs have a tendency to keep the shackles in a horizontal position and to insure the entrance of the shackle of the draw-head of one car into that of the other.

When the two draw-heads are connected the hook a of the shackle B of one of them catches over the inner rounded end, c, of the other, as shown clearly in Fig. 1, the lower shackle not being connected, but hanging loose. The upper shackle is held down on the rounded inner end of the other by a spring, D, as shown in Fig. 1, each draw-head being provided with one of them.

To the rear part of each shackle B there is attached a chain, $D^\times$. These chains are attached to the upper sides of the shackles and extend down behind them to the rear of the draw-heads, and pass around pulleys d through the side of the draw-heads and are attached to levers E. These chains are for the purpose of elevating the hooks a of the upper shackle off from the inner end of the lower one in order to disconnect the two draw-heads. When two draw-heads come in contact one shackle passes over the other and catches over the rear end of the lower one.

The device is extremely simple, and it possesses the advantage of disconnecting itself in case a car is thrown from the track, as the shackles, when twisted or turned obliquely, will disengage themselves.

Having thus described my invention, I claim as new, and desire to secure by Letters Patent—

1. The shackles B, provided with hooks a at their outer ends, and fitted in the draw-heads, so as to work or swing vertically, and one catch over the inner end of the other, substantially as and for the purpose herein set forth.

2. The coil-spring C, attached to one of the journals of the shackles for the purpose of keeping the latter in a horizontal position, as described.

3. The springs D, placed within the draw-heads A A, when used in combination with the shackles B, substantially as and for the purpose specified.

4. The chains $D^\times$, attached to the rear parts of the shackles B, and having levers E connected to their rear ends, substantialy as and for the purpose set forth.

G. E. CLARKE.

Witnesses:
   L. M. BROWN,
   D. MCDONALD.